(12) United States Patent
Adamczyk et al.

(10) Patent No.: US 10,676,062 B2
(45) Date of Patent: Jun. 9, 2020

(54) INFLATOR FILTER

(71) Applicants: TRW Vehicle Safety Systems Inc., Washington, MI (US); ACS Industries, Inc, Lincoln, RI (US)

(72) Inventors: Patrick R. Adamczyk, Gilbert, AZ (US); Anthony C. Uribe, Gilbert, AZ (US); Blake A. Hill, Tempe, AZ (US); Steven D. Huntsman, North Ogden, UT (US)

(73) Assignees: TRW VEHICLE SAFETY SYSTEMS INC., Washington, MI (US); ACS INDUSTRIES, INC., Lincoln, RI (US)

( * ) Notice: Subject to any disclaimer, the term of this patent is extended or adjusted under 35 U.S.C. 154(b) by 94 days.

(21) Appl. No.: 15/873,936

(22) Filed: Jan. 18, 2018

(65) Prior Publication Data
US 2018/0229687 A1 Aug. 16, 2018

Related U.S. Application Data

(60) Provisional application No. 62/459,660, filed on Feb. 16, 2017.

(51) Int. Cl.
| | | |
|---|---|---|
| *B60R 21/26* | (2011.01) | |
| *B60R 21/272* | (2006.01) | |
| *B01D 39/20* | (2006.01) | |
| *B01D 46/52* | (2006.01) | |
| *B01D 39/12* | (2006.01) | |

(52) U.S. Cl.
CPC ............ *B60R 21/272* (2013.01); *B01D 39/12* (2013.01); *B01D 39/2027* (2013.01); *B01D 46/527* (2013.01); *B01D 46/528* (2013.01); *B60R 21/26* (2013.01); *B01D 2239/0695* (2013.01); *B01D 2279/10* (2013.01); *B60R 2021/26011* (2013.01)

(58) Field of Classification Search
CPC ..... B60R 21/26; B60R 21/272; B01D 46/528; B01D 46/527; B01D 39/12; B01D 39/2027; B01D 2279/10; B01D 2239/0695
See application file for complete search history.

(56) References Cited

U.S. PATENT DOCUMENTS

| | | | | |
|---|---|---|---|---|
| 5,100,171 A | * | 3/1992 | Faigle | B01D 39/10 280/736 |
| 5,360,232 A | * | 11/1994 | Lowe | B01D 39/12 280/736 |
| 5,547,638 A | * | 8/1996 | Rink | B01D 39/2051 280/736 |
| 5,562,304 A | * | 10/1996 | Gest | B60R 21/2644 280/740 |
| 6,116,643 A | | 9/2000 | Katsuda et al. | |
| 7,823,919 B2 | | 11/2010 | Jackson et al. | |
| 2002/0005636 A1 | * | 1/2002 | McFarland | B60R 21/2644 280/736 |
| 2007/0214768 A1 | | 9/2007 | Koyama et al. | |
| 2008/0150260 A1 | * | 6/2008 | Whang | B60R 21/2644 280/728.1 |

(Continued)

*Primary Examiner* — James A English
(74) *Attorney, Agent, or Firm* — Tarolli, Sundheim, Covell & Tummino LLP

(57) ABSTRACT

A filter for an inflator includes a rolled sheet centered on an axis or three dimensionally printed as a whole and including a plurality of openings. A deflector is associated with each opening for directing inflation fluid in a non-radial direction relative to the axis.

14 Claims, 16 Drawing Sheets

(56) References Cited

U.S. PATENT DOCUMENTS

| | | | | |
|---|---|---|---|---|
| 2009/0184504 A1* | 7/2009 | Greenwood | ............ | B01D 46/24 |
| | | | | 280/741 |
| 2009/0295132 A1* | 12/2009 | Jackson | ................ | B01D 39/12 |
| | | | | 280/736 |
| 2011/0239892 A1* | 10/2011 | Von Breitenbach | ... | B01D 45/06 |
| | | | | 102/530 |
| 2015/0128799 A1* | 5/2015 | Laubacher | ............ | B60R 21/261 |
| | | | | 95/23 |
| 2015/0197213 A1* | 7/2015 | Clark | ..................... | B60R 21/26 |
| | | | | 280/741 |
| 2018/0056924 A1* | 3/2018 | Clark | ................... | B60R 21/261 |

* cited by examiner

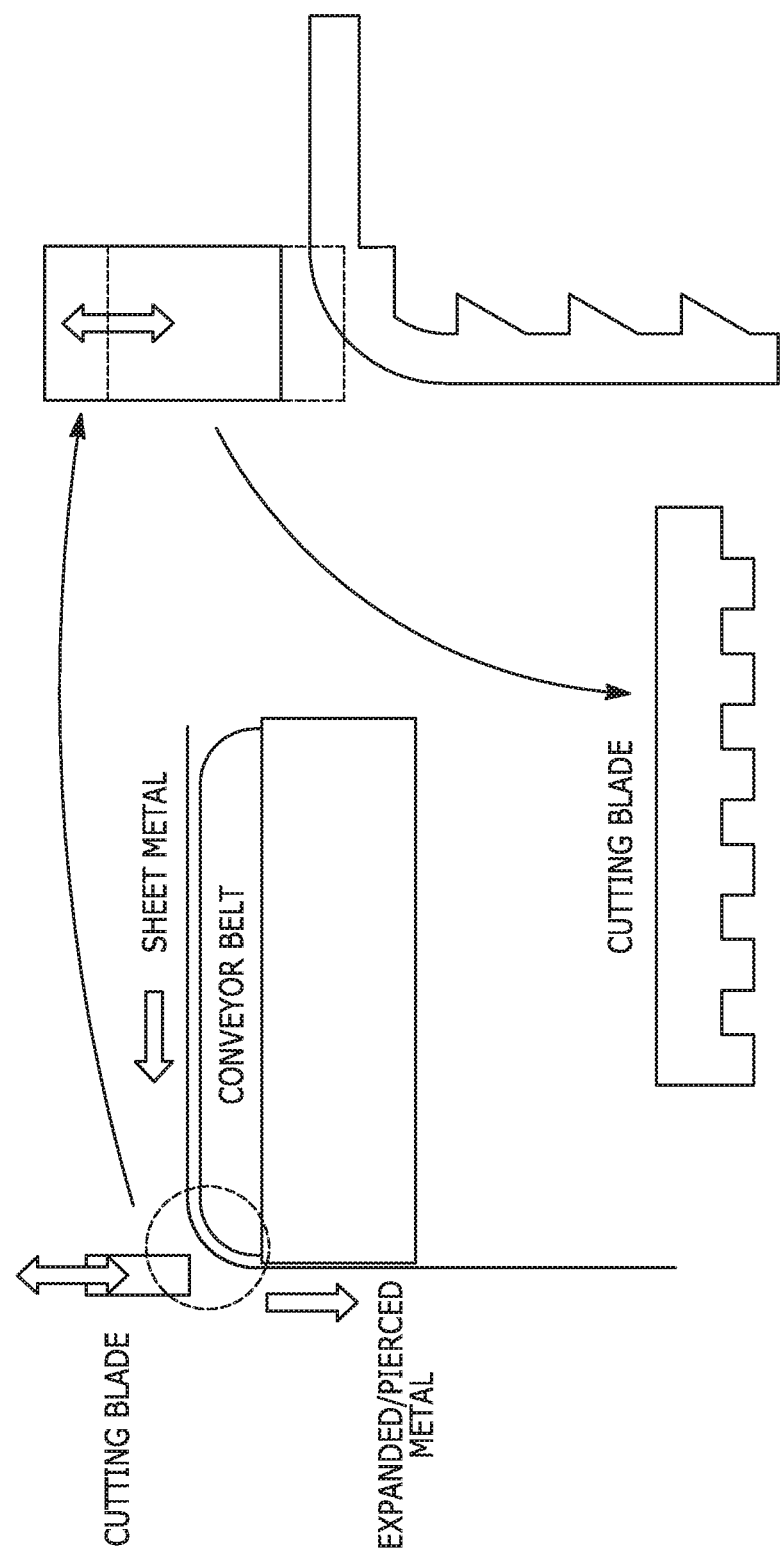

INFLATOR FILTER

RELATED APPLICATION

This application claims the benefit of U.S. Provisional Application No. 62/459,660, which was filed on 16 Feb. 2017.

TECHNICAL FIELD

The present invention relates generally to inflators and more specifically, relates to a filter for filtering particulates from Inflation fluid, for helping to cool inflation fluid, and for directing the flow path of inflation fluid.

BACKGROUND

Inflators that provide inflation fluid to inflate an inflatable vehicle occupant protection device are known. The known inflators can include filters through which the inflation fluid is directed to remove particulates from the inflation fluid or to help cool the inflation fluid.

SUMMARY

The invention relates to a new and improved inflator filter that directs inflation fluid in a non-radial direction, e.g., circumferentially or axially.

According to one aspect, a filter for an inflator includes a rolled sheet centered on an axis or three dimensionally printed as a whole and including a plurality of openings. A deflector is associated with each opening for directing inflation fluid in a non-radial direction relative to the axis.

According to another aspect, alone or in combination with any other aspect, the sheet can be formed from expanded metal.

According to another aspect, alone or in combination with any other aspect, the sheet can be rolled to form a plurality of radial layers.

According to another aspect, alone or in combination with any other aspect, the deflectors can be arranged in a first pattern on a first radial layer and can be arranged in a second, different pattern on a second radial layer.

According to another aspect, atone or in combination with any other aspect, the deflectors on the first radial layer can have a first shape and the deflectors on the second radial layer can have a second shape different from the first shape.

According to another aspect, alone or in combination with any other aspect, the deflectors can direct inflation fluid circumferentially about the axis.

According to another aspect atone or in combination with any other aspect, the deflectors can direct inflation fluid axially in a direction substantially parallel to the axis.

According to another aspect, atone or in combination with any other aspect the deflectors can have a polygonal shape.

According to another aspect alone or in combination with any other aspect, the deflectors can have a curved shape.

According to another aspect, alone or in combination with any other aspect, deflectors on a first radial layer of the filter can abut a second radial layer of the filter.

According to another aspect alone or in combination with any other aspect, the inflator can Inflate a vehicle occupant protection device comprising at least one of a driver side air bag, a passenger side air bag, an Inflatable side curtain, an inflatable headliner, an inflatable seat belt, an inflatable knee bolster, and a knee bolster operated by an air bag.

According to another aspect, alone or in combination with any other aspect, each deflector can define an exit opening in fluid communication with the associated opening in the sheet.

According to another aspect, alone or in combination with any other aspect each deflector can define a gap/plenum inside the filter or between the layers.

According to another aspect, alone or in combination with any other aspect, a hybrid inflator can include the filter.

According to another aspect, alone or in combination with any other aspect, a two-stage pyrotechnic Inflator can include the filter.

According to another aspect, alone or in combination with any other aspect, a single-stage pyrotechnic inflator can include the filter.

Other objects and advantages and a fuller understanding of the invention will be had from the following detailed description and the accompanying drawings.

BRIEF DESCRIPTION OF THE DRAWINGS

FIGS. 4C-4E illustrate manufacturing steps for forming the filter of FIG. 4B.

DETAILED DESCRIPTION

Figure 1:
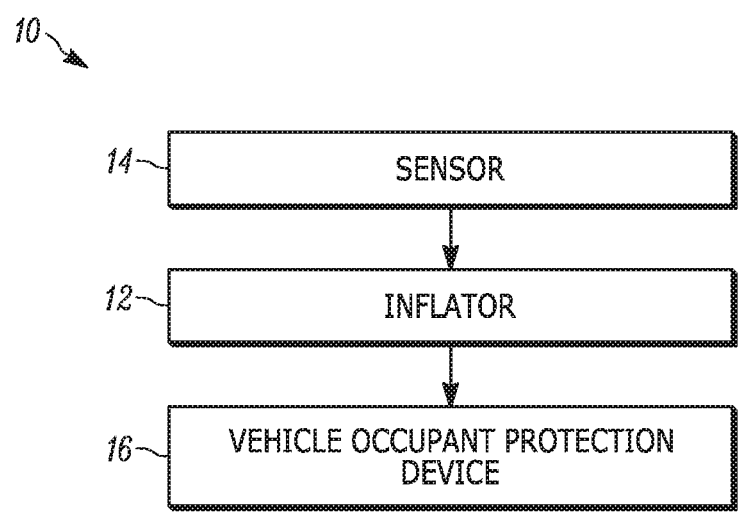
FIG. 1 is a schematic Illustration of an apparatus including a filter in accordance with the present invention.

The present Invention relates generally to inflators and more specifically, relates to a filter for filtering particulates from inflation fluid, for helping to cool inflation fluid, and for directing the flow path of inflation fluid. Referring to FIG. 1, an apparatus 10 for helping to protect an occupant of a vehicle (not shown) includes an Inflatable vehicle occupant protection device 16. In the illustrated embodiment of the present invention, the inflatable vehicle occupant protection device 16 comprises an air bag inflatable away from an instrument panel of the vehicle between the instrument panel and a vehicle occupant. For example, the inflatable vehicle occupant protection device 16 can be a driver side air bag inflatable from a stored condition in a vehicle steering wheel or a passenger side air bag inflatable from a stored condition in the instrument panel. As another example, the inflatable vehicle occupant protection device 16 could be an inflatable side curtain, an inflatable headliner, an inflatable seat belt, an inflatable knee bolster, or a knee bolster operated by an air bag.

The apparatus 10 includes an inflator 12 associated with the inflatable vehicle occupant protection device 16. The inflator 12 is actuatable to generate inflation fluid to inflate the inflatable vehicle occupant protection device 16. The apparatus 10 also includes a sensor 14 for sensing a vehicle condition for which actuation of the inflator 12 can be desired. For example, the sensor 14 can sense vehicle deceleration. In this example, the sensor 14 measures the magnitude and duration of the vehicle deceleration. If the magnitude and duration of the deceleration meet predetermined threshold levels, the sensor 14 either transmits a signal or causes a signal to be transmitted to actuate the inflator 12. Upon actuation, the inflator 12 provides inflation fluid to inflate the inflatable vehicle occupant protection device 16. The protection device 16, when inflated, helps to protect an occupant of the vehicle.

In the illustrated embodiment, the inflator 12 is a pyrotechnic inflator that uses the combustion of gas-generating material to generate inflation fluid. The inflator 12 could, however, have a variety of alternative configurations. For example, the inflator 12 could be a stored gas inflator that contains a stored quantity of pressurized Inflation fluid in the form of a gas. The Inflator 12 alternatively could contain a combination of pressurized Inflation fluid and ignitable material for heating the inflation fluid. As a further alternative, the inflator 12 could be of any suitable type or construction for supplying an inflation medium.

Figure 2:
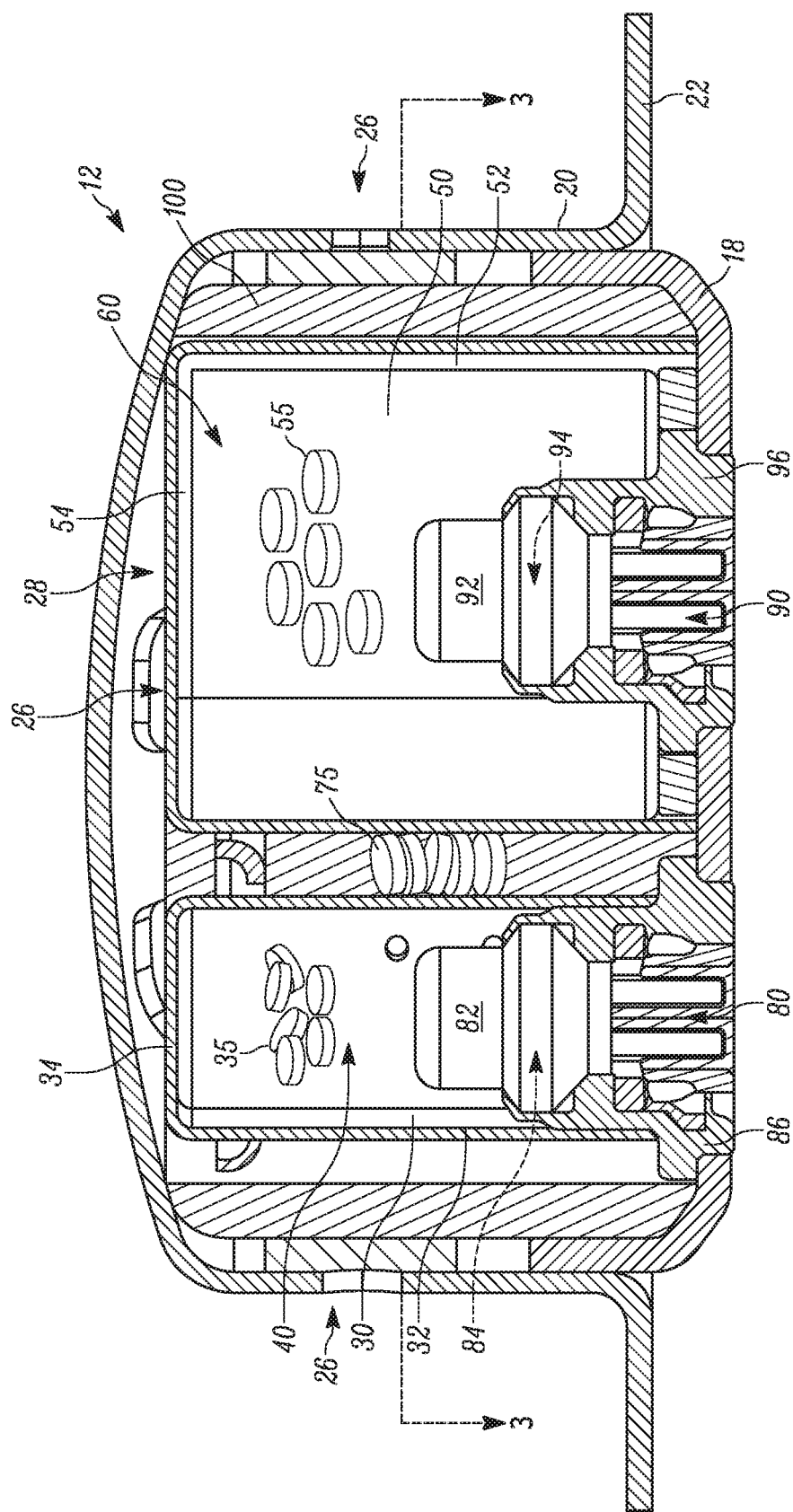
FIG. 2 is a section view of an inflator including the filter.
Figure 3:
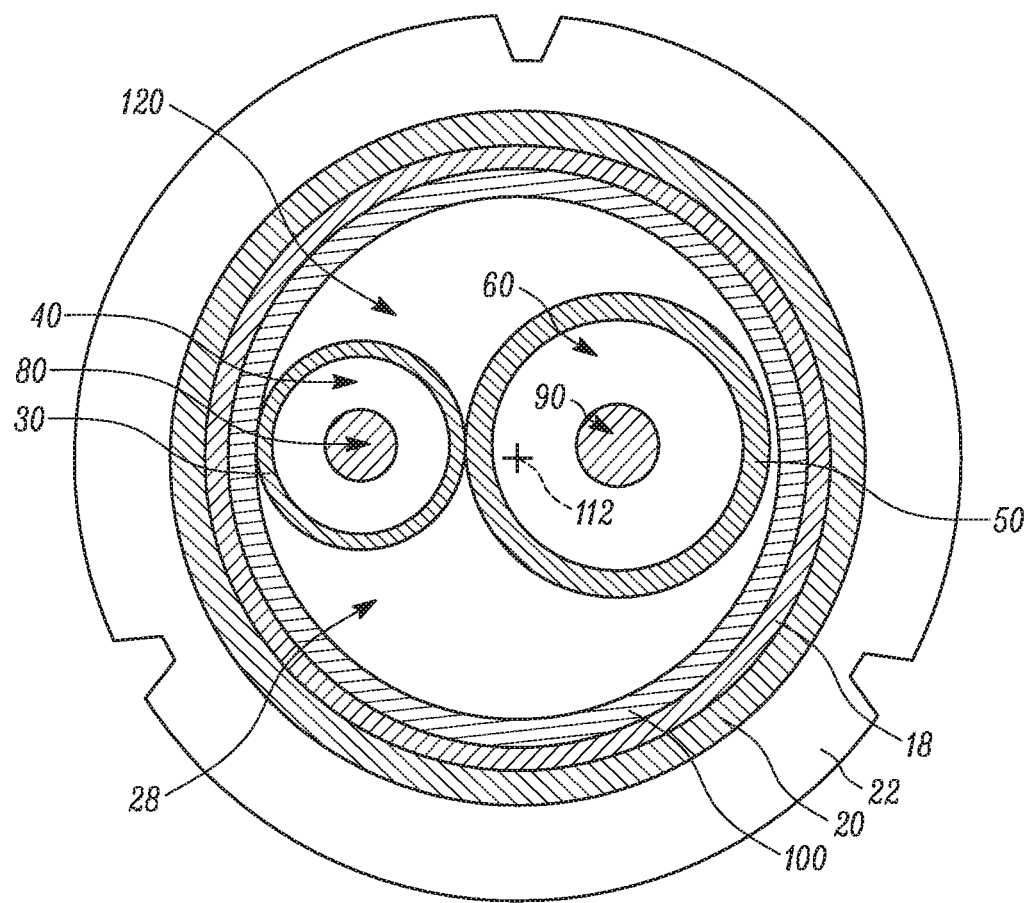
FIG. 3 is a top view of FIG. 2.

The specific configuration of the inflator 12 can vary. FIG. 2 illustrates an example of one possible configuration of the inflator 12. In FIG. 2, the inflator 12 includes a base section 18 and a diffuser section 20. The two sections 18 and 20 are joined together by means (not shown), such as welding, threaded fasteners, or rivets and cooperate to define an interior 28. The diffuser section 20 includes a mounting flange 22 for securing the inflator 12 to the vehicle and the vehicle occupant protection device 14. The diffuser section 20 further includes outlet openings 26 through which inflation fluid can be directed into the inflatable vehicle occupant protection device 16.

A first combustion cup 30 is provided within the interior 28 of the inflator 12. The first combustion cup 30 comprises an outer cylindrical wall 32 and an annular top wall 34. The first combustion cup 30 helps define a combustion chamber 40 having a generally cylindrical configuration. The combustion chamber 40 houses a gas generating material 35 of any suitable type or configuration, e.g., propellant pellets.

The combustion chamber 40 receives an igniter 80. The igniter 80 includes a housing 82 that supports a body of ignitable material 84. The housing 82 also supports a squib containing a small charge of ignitable material (not shown). The squib includes electric leads operatively connected to the sensor 14 (see FIG. 1). An igniter carrier 86 secures the igniter 80 to the base section 18.

A second combustion cup 50 is also provided within the interior 28 of the inflator 12. The second combustion cup 50 comprises an outer cylindrical wall 52 and an annular top wall 54. The second combustion cup 50 helps define a combustion chamber 60 having a generally cylindrical configuration. The combustion chamber 60 houses a gas generating material 55 of any suitable type or configuration, e.g., propellant pellets acting as a booster charge.

The combustion chamber 60 receives an igniter 90. The igniter 90 includes a housing 92 that supports a body of ignitable material 94. The housing 92 also supports a squib containing a small charge of ignitable material (not shown). The squib includes electric leads operatively connected to the sensor 14 (see FIG. 1). An igniter carrier 96 secures the igniter 90 to the base section 18.

An additional gas generating material 75 of any suitable type or configuration, e.g., propellant pellets, is provided in the interior 28 and outside both combustion chamber cups 30, 50. In operation, the igniter 80 is actuated first which causes ignition of the propellant 35. The ignited propellant 35 exits the first combustion chamber cup 30 through openings (not shown) therein. The combustion products exiting the first combustion chamber cup 30 ignite the propellant 75, producing inflation fluid and combustion products which flow towards the openings 26. If desired, the second igniter 90 is actuated to ignite the propellant 55, which produces inflation fluid and combustion products that exit the second combustion chamber cup 50 in a known manner and flow towards the openings 26.

An inflation fluid filter 100 extends annually around the combustion chambers 40, 60 adjacent the base section 18 and diffuser section 20 and radially inward of the outlet openings 25. Consequently, inflation fluid passes through the filter 100 prior to being discharged from the inflator 12 through the outlet openings 28.

Figure 4A:
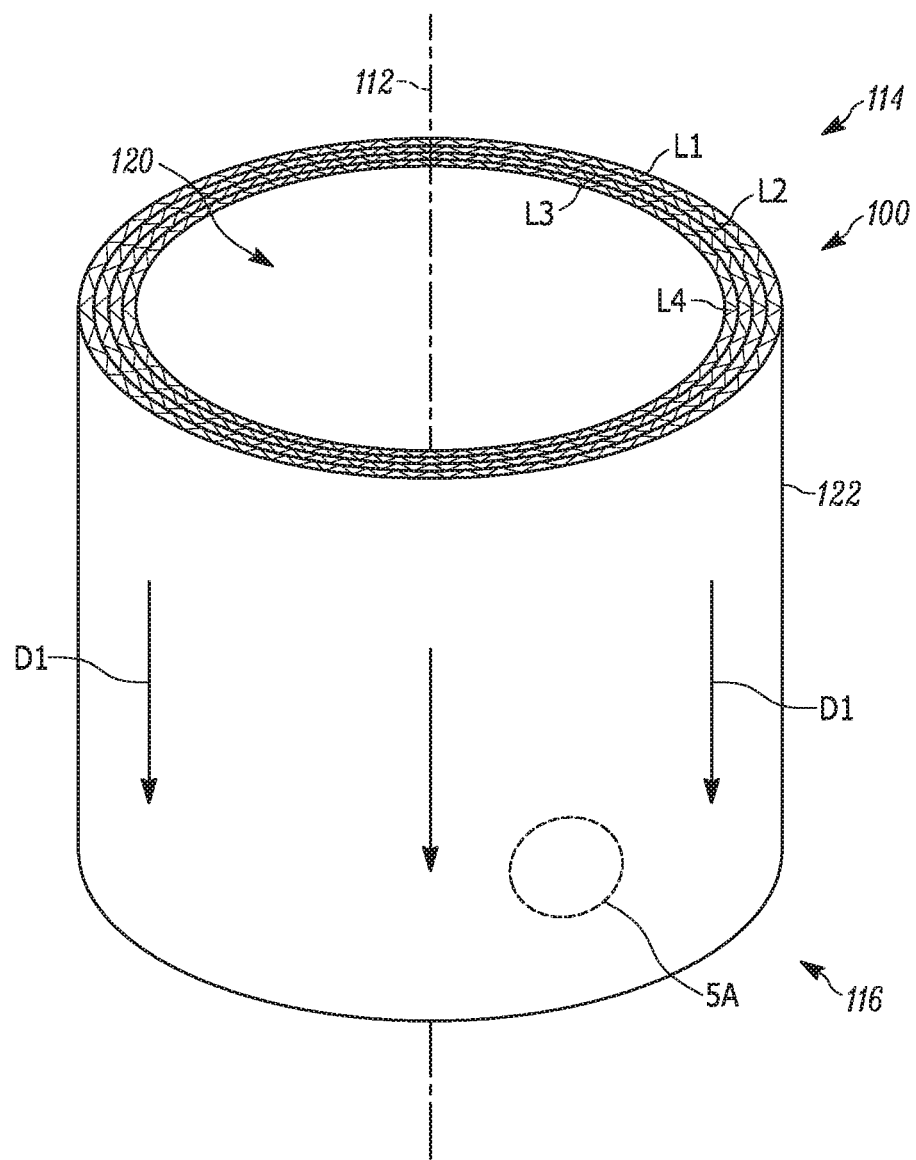
FIG. 4A is a front view of an example filter in accordance with the present invention.

Referring to FIG. 4A, the filter 100 has a generally cylindrical configuration and extends along an axis or centerline 112 from a first end 114 to a second end 116. The filter 100 defines an interior or central passage 120 in which the combustion chambers 40, 60 and the primary propellant 75 are positioned.

The filter 100 can have a variety of constructions. In one example, the filter 100 is constructed of a sheet 122 made of any metal e.g., carbon steel, stainless steel or other suitable metal or metal alloy, plastic or any polymer capable of withstanding high temperature during airbag Inflation, in one example, the sheet 122 is formed from an expanded metal material. Alternatively, the sheet 122 can be formed from perforated metal (not shown). The sheet 122 can have a thickness of about 0.10 millimeters or greater. The sheet 122 can be formed using known metalworking processes or three-dimensionally printed.

Figure 4B:
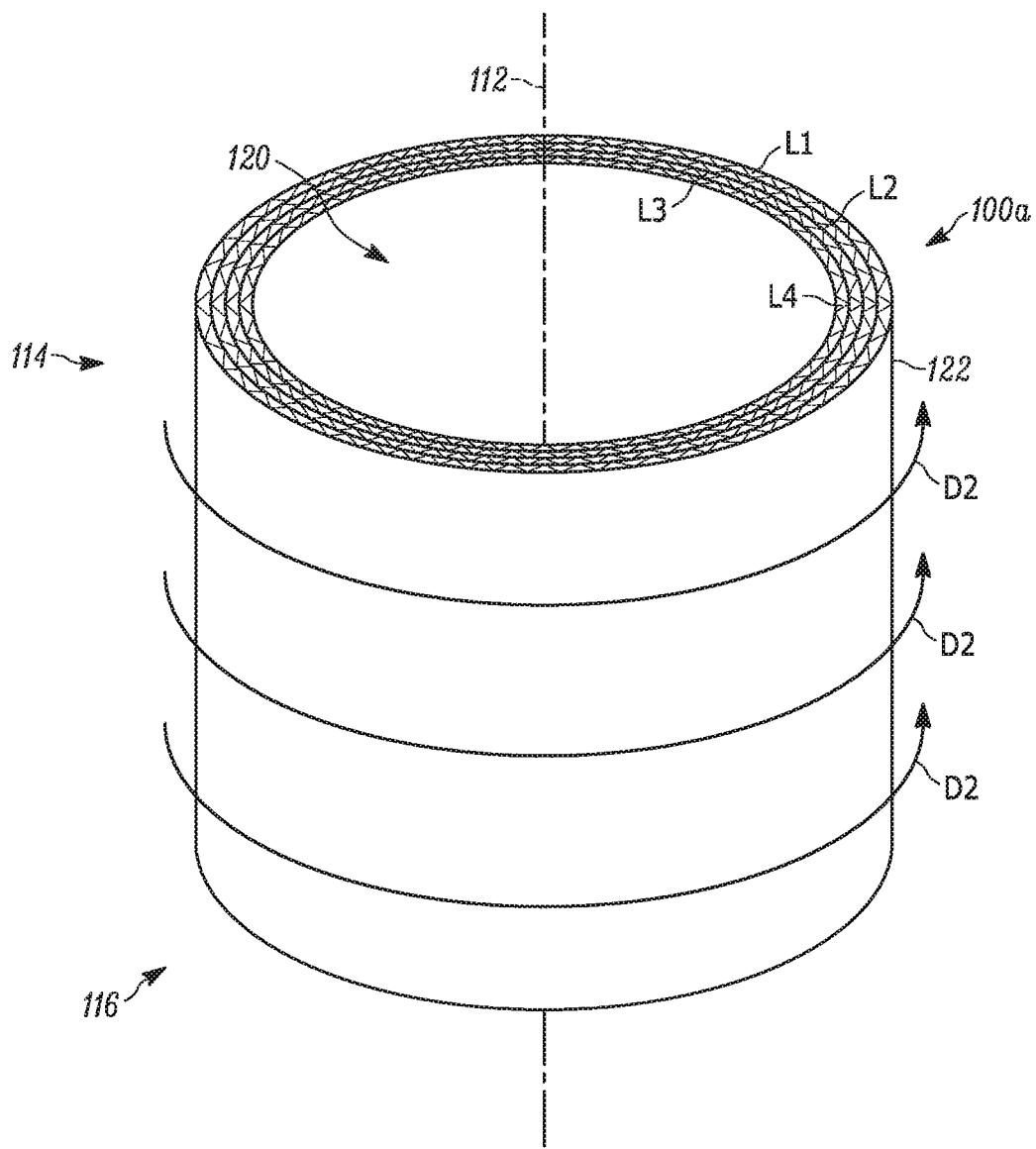
FIG. 4B is a front view of another example filter in accordance with the present invention.
Figure 4C:
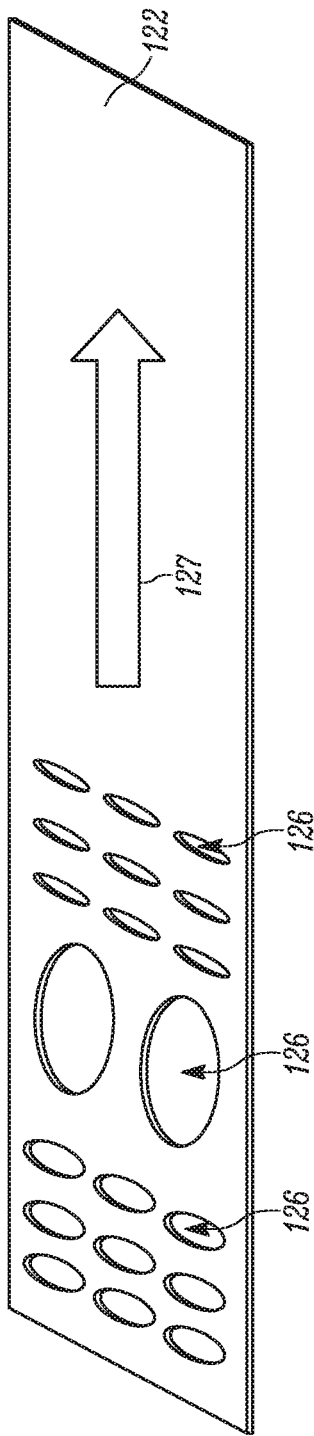
Figure 4D:
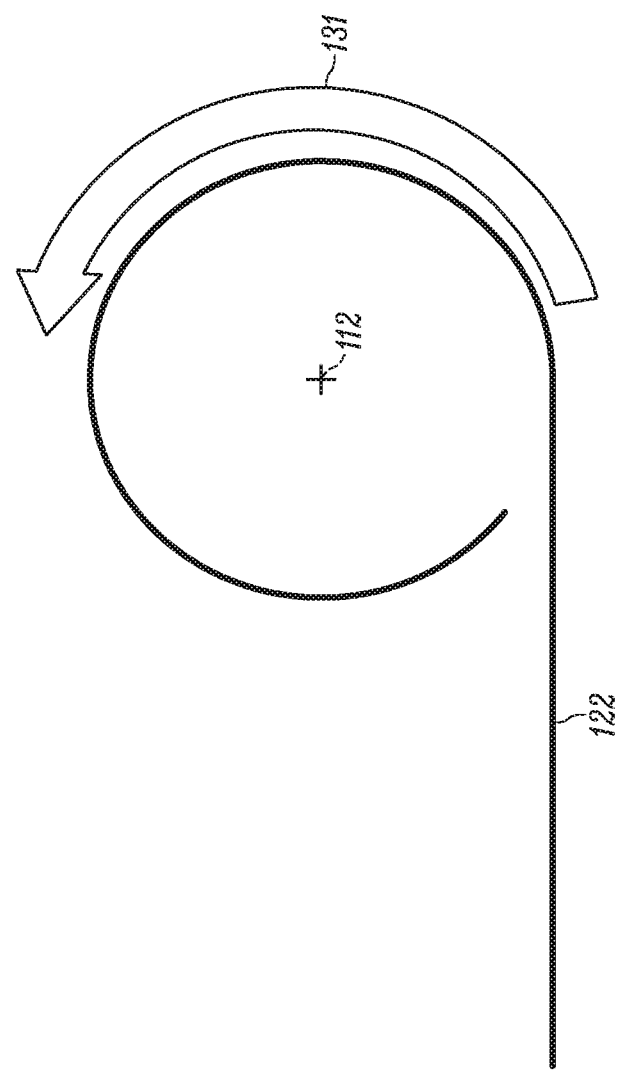

Referring to FIGS. 4C-4E, the metal sheet 122 is rolled or wrapped about itself to form multiple layers in the shape of a cylinder. More specifically, the metal sheet 122 is transported by a conveyor to a cutting blade that initially pierces or otherwise provides the metal sheet with the openings, examples of which are indicated at 126 in FIG. 4C and in FIG. 4E. The metal sheet 122 can then be pulled, stretched or expanded in one or more directions, as indicated generally by the arrow 127, until the openings 126 are stretched to the desired size and/or shape. Alternatively, the pulling/stretching/etc. step Is omitted. The metal sheet 122 is then rolled about the centerline 112 to form a cylindrical shape, as indicated generally at 131 in FIG. 4D. In the example configuration of FIGS. 4A-4B, the filter 100 includes four rolled layers indicated generally at L1-L4 and arranged concentrically about the centerline 112. Alternatively, the filter can be three-dimensionally printed as a whole.

Figure 5A:
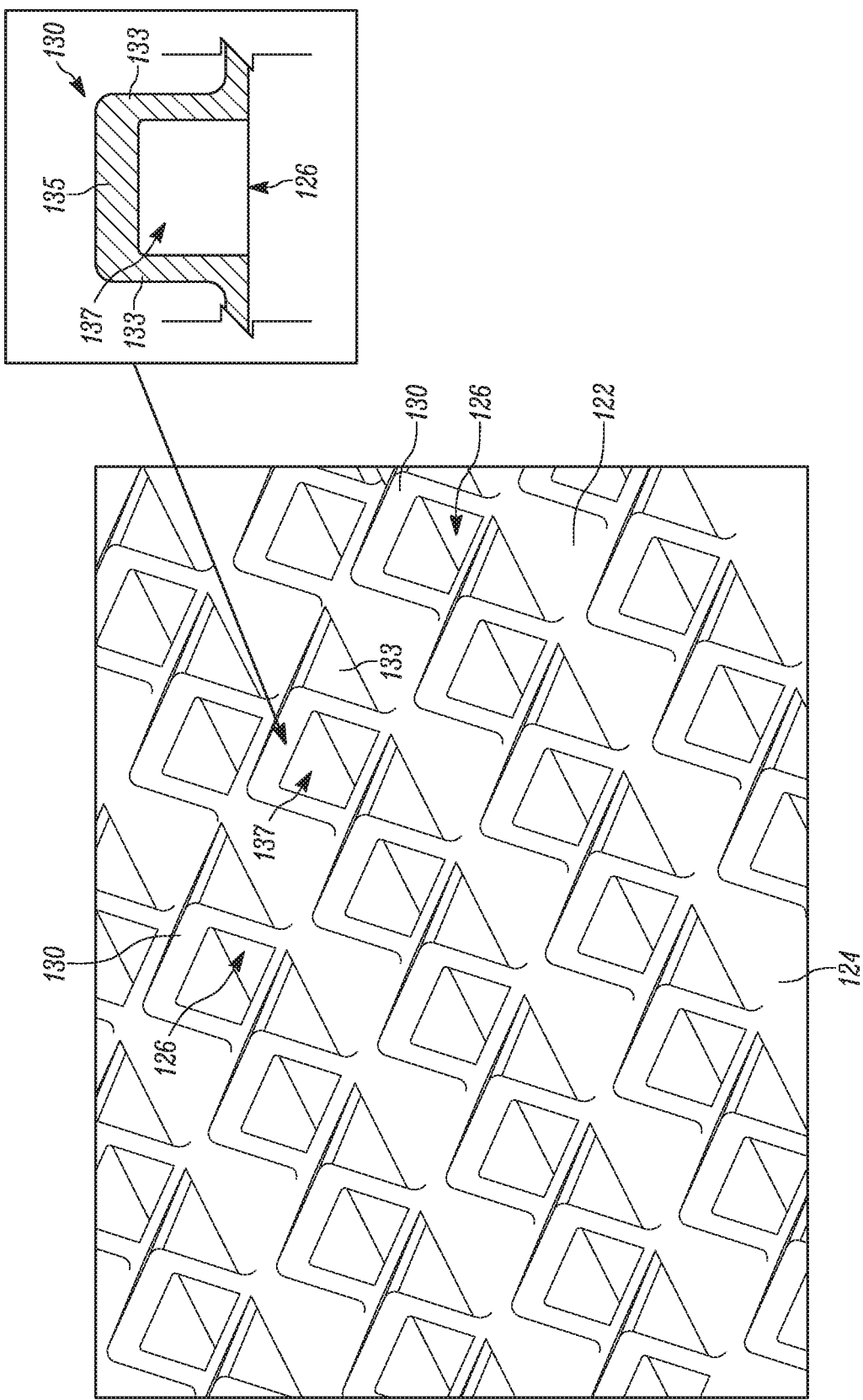
FIG. 5A is an enlarged view of deflectors on the filter of FIG. 4A.

The openings 126 extend entirely through the sheet 122 for allowing Inflation fluid to pass from the central passage 120 to outside the filter 100 through the layers L1-L4. Each opening 126 can have a round shape, such as circular or oval (as shown in FIG. 4C), a rectangular shape (as shown in FIG. 5A), a different polygonal shape or be irregularly shaped. The openings 126 can have the same shape or different shapes from one another and can be symmetrically or asymmetrically arranged about the filter 100 to provide desired inflation fluid flow paths.

A deflector or guide 130 is associated with each opening 126 for directing inflation fluid in a desired direction away from the filter 100. The deflectors 130 can be formed using dies, punches, presses, stamps, etc. or 3D-printed integrally with the sheet.

As shown in FIGS. 4A-5A, the deflectors 130 can have a rectangular shape. More specifically, each deflector 130 forms a cover or shroud over the associated opening 126 in the sheet 122. Referring to FIG. 5A, the deflector 130 includes a pair of sidewalls 133 having a triangular shape and extending parallel to one another. Alternatively, the deflector 130 can be free of sidewalls. The sidewalls 133 could alternatively extend at an angle relative to one another (not shown). A top or connecting wall 136 extends between the sidewalls 133. The walls 133, 135 cooperate to define an exit opening 137 fluidly connected to the opening 126 in the sheet 122.

Figure 5B:
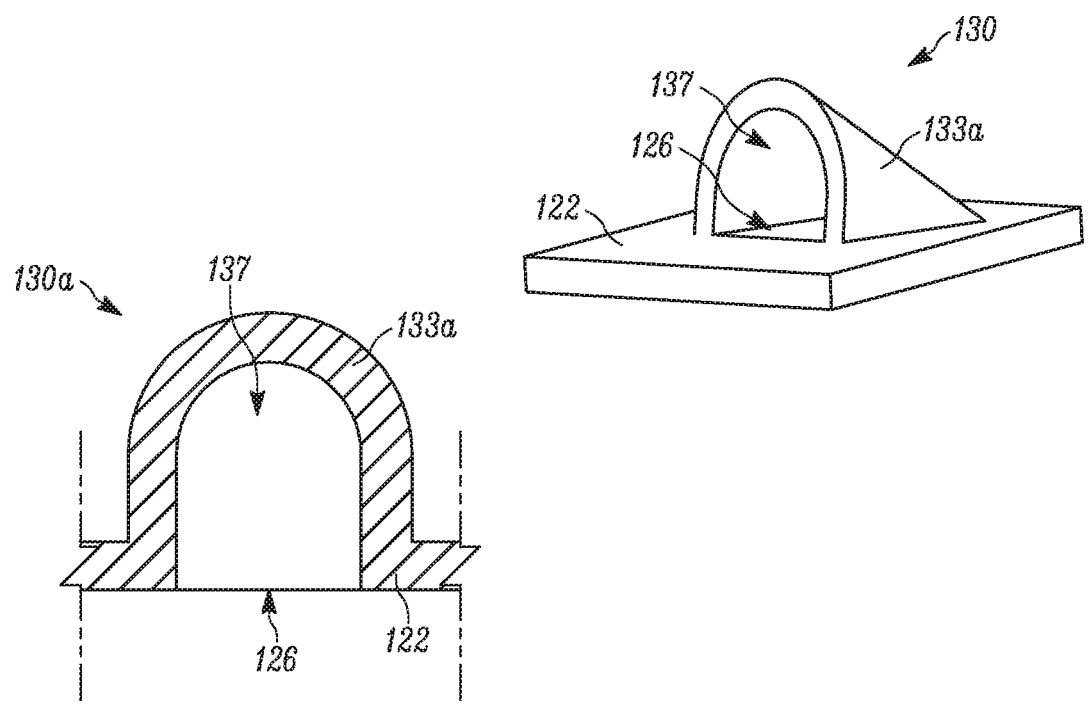
FIGS. 5B-5C are alternative configurations for the deflectors.
Figure 5C:
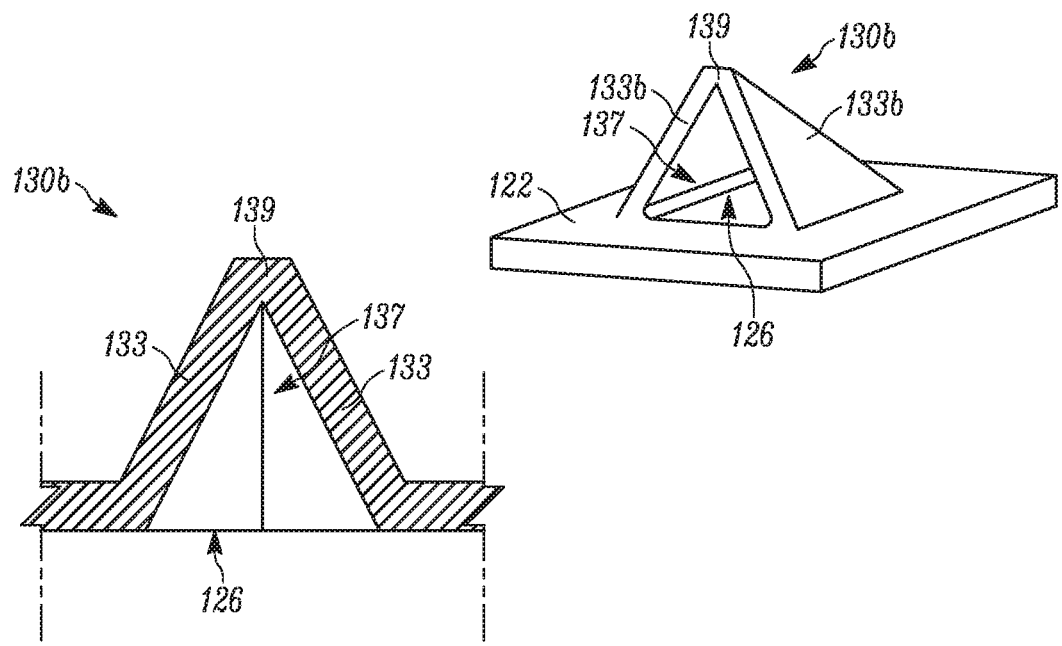

In another example, the deflectors 130a have an arcuate shape (FIG. 5B). In this construction, the deflector 130a includes a single, arch or dome-shaped sidewall 133a forming the shroud over the opening 126 and defining the exit opening 137. In yet another example, the deflectors 130b have a triangular shape (FIG. 5C). In this construction, the sidewalls 133b are triangular and are angled towards one another in a direction extending away from the sheet. The sidewalls 133b intersect one another at a junction or apex 139 and cooperate to define the exit opening 137.

As shown in FIG. 4A, the deflectors 130 direct inflation fluid exiting the openings 126 in a direction D1 generally towards the second end 116 of the filter 100. More specifically, inflation fluid flows through the openings 126, is deflected by the deflector 130 along a desired trajectory, and exits the filter through the exit openings 137. Alternatively, the deflectors 130 can direct inflation fluid in a direction opposite the direction D1 (not shown) generally towards the first end 114 of the filter 100. In both instances, the inflation fluid is directed substantially axially relative to the centerline 112 of the filter 100 and substantially parallel or at an acute angle relative thereto.

Both the defectors 130a and the deflectors 130b can likewise direct inflation fluid in the direction D1 or in the direction opposite the direction D1. In any case, the deflectors 130, 130a, 130b direct inflation fluid in a non-radial direction away from the filter 100. In other words, inflation fluid exits the filter 100 along a trajectory that is not normal or perpendicular to the outer surface 124 of the sheet 122 and, thus, the trajectory is transverse to the normal of the outer surface.

In an alternative configuration shown in FIG. 4B, the filter 100 a includes deflectors 130 configured to direct the inflation fluid in a generally circumferential direction D2 about the centerline 112. The direction can be clockwise (as shown) or counterclockwise. To this end, the orientation of the deflectors 130, 130a, 130b can be rotated 90° on the sheet 122 to achieve this Inflation fluid trajectory. In any case, inflation fluid in these configurations exits the filter 100 a along a trajectory that is not normal or perpendicular to the outer surface 124 of the sheet 122.

Figure 6:
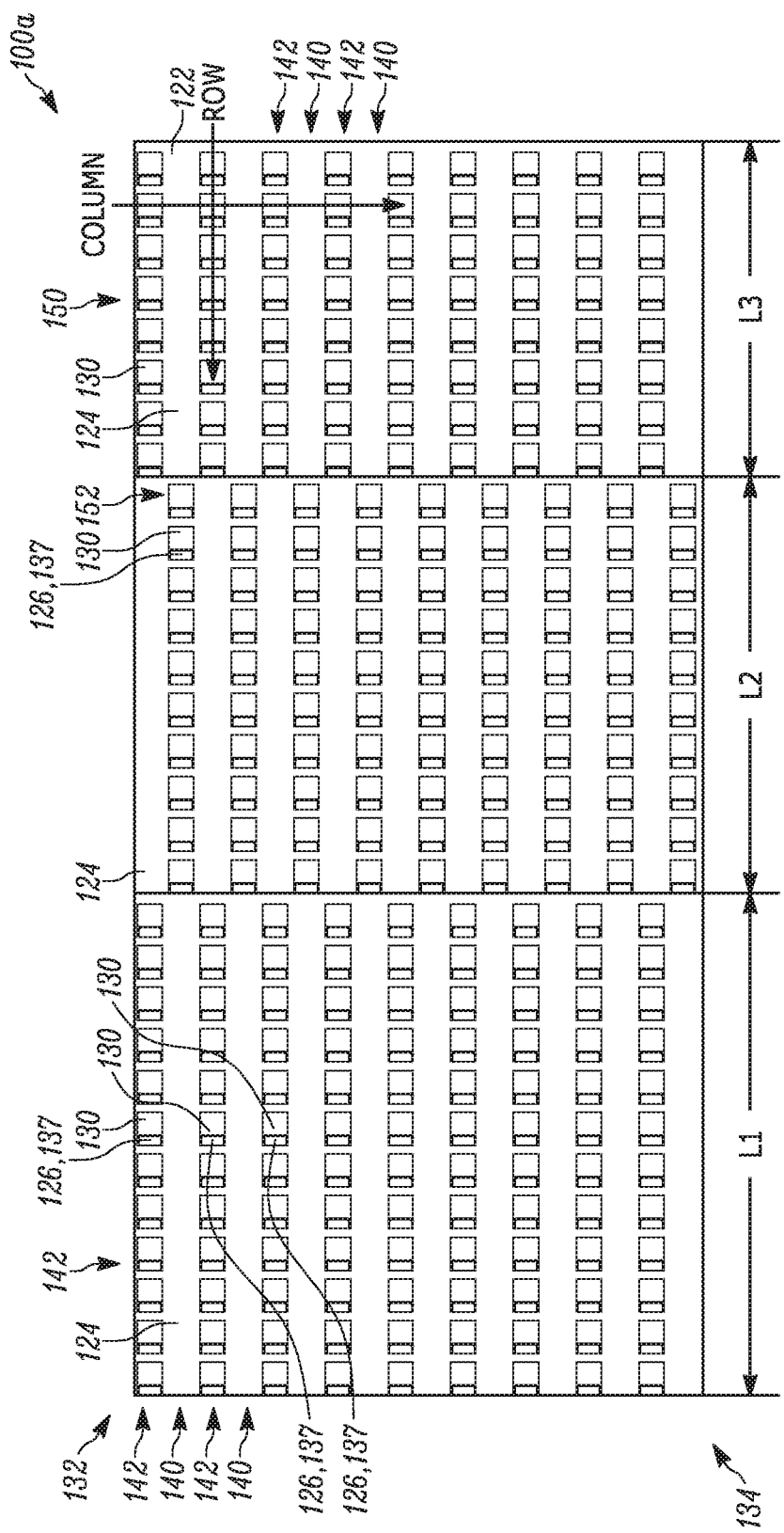
FIG. 6 is a front view of the filter of FIG. 4B in an unrolled condition.

FIG. 6 illustrates the filter 100 a in an unrolled condition, i.e., the sheet 122 is configured in a substantially planar orientation. The metal sheet 122 includes an outer surface 124 and extends from a first end 132 to a second end 134. The first end 132 corresponds with the first end 112 of the rolled filter 100a. The second end 134 corresponds with the second end 114 of the roller filter 100a.

The sheet 122 includes the plurality of openings 126 and their associated deflectors 130 arranged in rows 140, 142 (horizontal in FIG. 6) and columns 150, 152 (vertical in FIG. 6) that extend perpendicular to the rows. The sheet 122 is divided into portions representing successive layers L1-L3 of the rolled filter 100a. It will be appreciated that the rolled filter 100a can include more or fewer layers. That said, L1 identifies the rows 140, 142 and columns 150, 152 of the first layer in the rolled filter 100a. L2 identifies the rows 140, 142 and columns 150, 152 of the next layer radially inward of the first layer L1. L3 identifies the rows 140, 142 and columns 150, 152 of the next layer radially inward of the second layer L2. As shown, the first layer L1 is the outermost layer of the rolled filter and the third layer 13 is the innermost layer.

The rows 140 do not Include openings 126 or deflectors 130 and therefore constitute the unaltered outer surface 124 of the sheet 122, i.e., the rows are considered empty. The rows 142 include openings 126 and associated deflectors 130 positioned end-to-end with one another continuously along the entire row 142 in the first layer L1. The rows 140, 142 alternate with one another from the first end 132 of the sheet 122 to the second end 134 in different configurations depending on the layer L1-L3.

As shown in FIG. 6, in the first layer L1 and the third layer L3, the row 142 is the first row at the first end 132. In the second layer L2, the row 140 is the first row at the first end 132. The rows 140, 142 in the second layer L2 are therefore shifted or offset one row with respect to the rows of the adjacent layer L1, L3, i.e., the rows are shifted in an alternating fashion so that the rows 142 of openings 126/deflectors 130 of one layer longitudinally align with empty rows 140 of the adjacent layer(s). Consequently, the rows 140 in the layers L1, L3 are longitudinally aligned with one another and the rows 142 in the second layer L2. The rows 142 in the layers L1, L3 are longitudinally aligned with one another and the rows 140 in the second layer L2. The rows 140, 142 in the second layer L2 are therefore shifted one row down from the corresponding rows 140, 142 in the layers L1, L3.

Due to the shifted configuration of the rows 140, 142, the columns 150 in the first layer L1 are the same as the columns 150 in the third layer L3. More specifically, each column 150 in the layers L1 and L3 starts with an opening 126 and corresponding deflector 130 at the first end 132 and alternates between the opening/deflector combination and the outer surface 124 until reaching the second end 134 of the sheet 122. Neither the first layer L1 nor the third layer L3 includes the columns 152.

In the second layer L2, each column 152 starts with the outer surface 124 of the sheet 122 at the first end 132 and alternates between the outer surface and the opening 126/deflector 130 combination until reaching the second end 134 of the sheet 122. The second layer L2 does not Include the columns 150.

Figure 7:
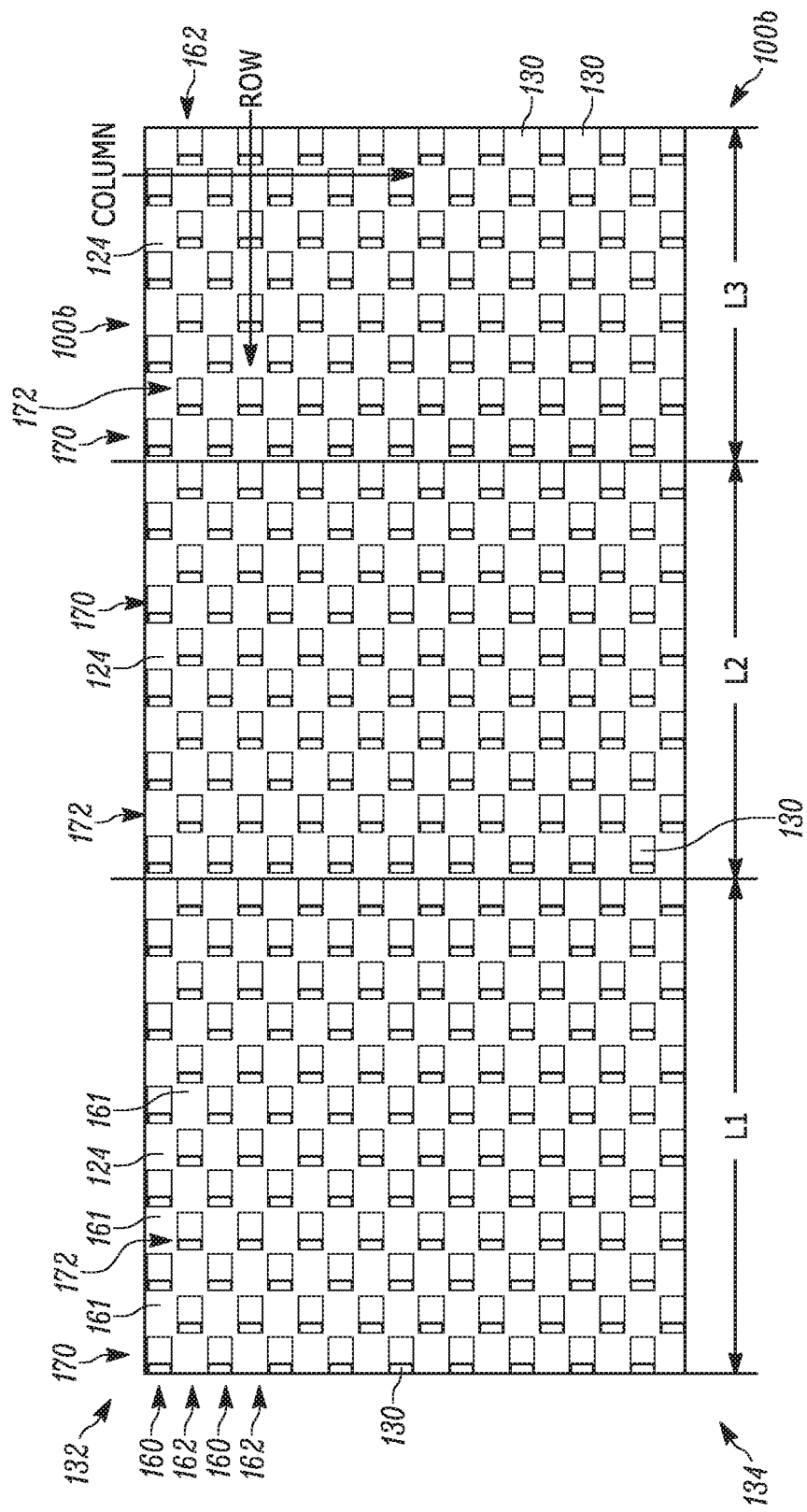
FIG. 7 is a front view of an alternative configuration of the filter in FIG. 4B in an unrolled condition.

FIG. 7 illustrates another example configuration of the filter 100b depicting the sheet 122 in an unrolled condition and having a modified arrangement of the openings 126 and deflectors 130 in the rows and columns. In this example, the sheet 122 includes a plurality of rows 160, 162 (horizontal in FIG. 7) and columns 170, 172 (vertical in FIG. 7) extending perpendicular to the rows. L1 identifies the rows 160, 162 and columns 170, 172 of the first layer in the rolled filter 100a. L2 identifies the rows 160, 162 and columns 170, 172 of the next layer radially inward of the first layer 12. L3 identifies the rows 160, 162 and columns 160, 162 of the next layer radially Inward of the second layer L2. As shown, the first layer L1 is the outermost layer of the rolled filter and the third layer L3 is the innermost layer.

The row 160 is similar to the row 140 but the openings 126 and associated deflectors 130 are spaced further from one another along the length of the row. More specifically, the deflectors 130 are spaced from one another within the row 160 by an unaltered or empty portion 181 of the outer surface 124 having substantially the same sized footprint as the deflector. Each row 160 starts with an opening/defector combination at the left side of the first layer L1 (as shown in FIG. 7) and alternates between the opening/deflector combination and the empty portion 181 of the outer surface 124 to the right side of the first layer.

The row 162 is similar to the row 160 except that the row 162 starts with the empty portion 161 of the outer surface 124 at the left side of the first layer L1 (as shown in FIG. 7) and alternates between the empty portion of the outer surface and the opening/deflector combination to the right side of the first layer. The rows 180, 162 alternative with one another from the first end 132 of the sheet 122 to the second end 134. Moreover, the rows 160, 162 do not change between the layers L1-L3 such that the rows 160 are longitudinally aligned end-to-end with one another through all three layers and the rows 162 are longitudinally aligned end-to-end with one another through all three layers.

Due to the configuration of the rows 160, 162, each column 170 starts with an opening 126/deflector 130 combination at the first end 132 and alternates between the opening/deflector combination and the empty portion 161 of the outer surface 124 to the second end 134. On the other hand, each column 172 starts with the empty portion 161 of the outer surface 124 at the first end 132 and alternates between the opening 126/deflector 130 combination and the empty portion 161 of the outer surface 124 to the second end 134. The columns 170, 172 alternative with one another in the left-to-right direction (as viewed in FIG. 7) across the entire length of the sheet 122. Each layer L1-L3 therefore has the same column 170, 172 arrangement.

The columns 172 within each layer L1-L3, however, are shifted one row with respect to the adjacent columns 170, i.e., the columns have an alternating shift or offset of one row. Due to the configuration of each row 160, 162 and column 170, 172, and the spacing of the deflectors 130 from one another within each row and column by the empty portion 161 of the outer surface 124, the deflectors are arranged in a checkerboard fashion on the sheet 122.

It will be appreciated that the filter of the present invention could include combinations of any of the rows 140, 142, 160, 162 and any of the columns 150, 152, 170, 172. To this end, any layer L1-L3 can have any arrangement and number of rows 140, 142, 160, 162 and any arrangement and number of columns 150, 152, 170, 172. Consequently, the deflector 130 arrangement on any one layer L1-L3 can be the same as or different from the deflector arrangement on any other layer L1-L3. Moreover, the deflectors 130 can be arranged in any desirable pattern on the layer(s) L1-L3 different from those shown and described to meet desired performance criterion. Any single deflector in any row or any column can have any of the configurations shown and described. For example, the deflectors on one layer can be configured to direct inflation fluid axially and the deflectors on another layer can be configured to direct Inflation fluid circumferentially (not shown).

Figure 8:
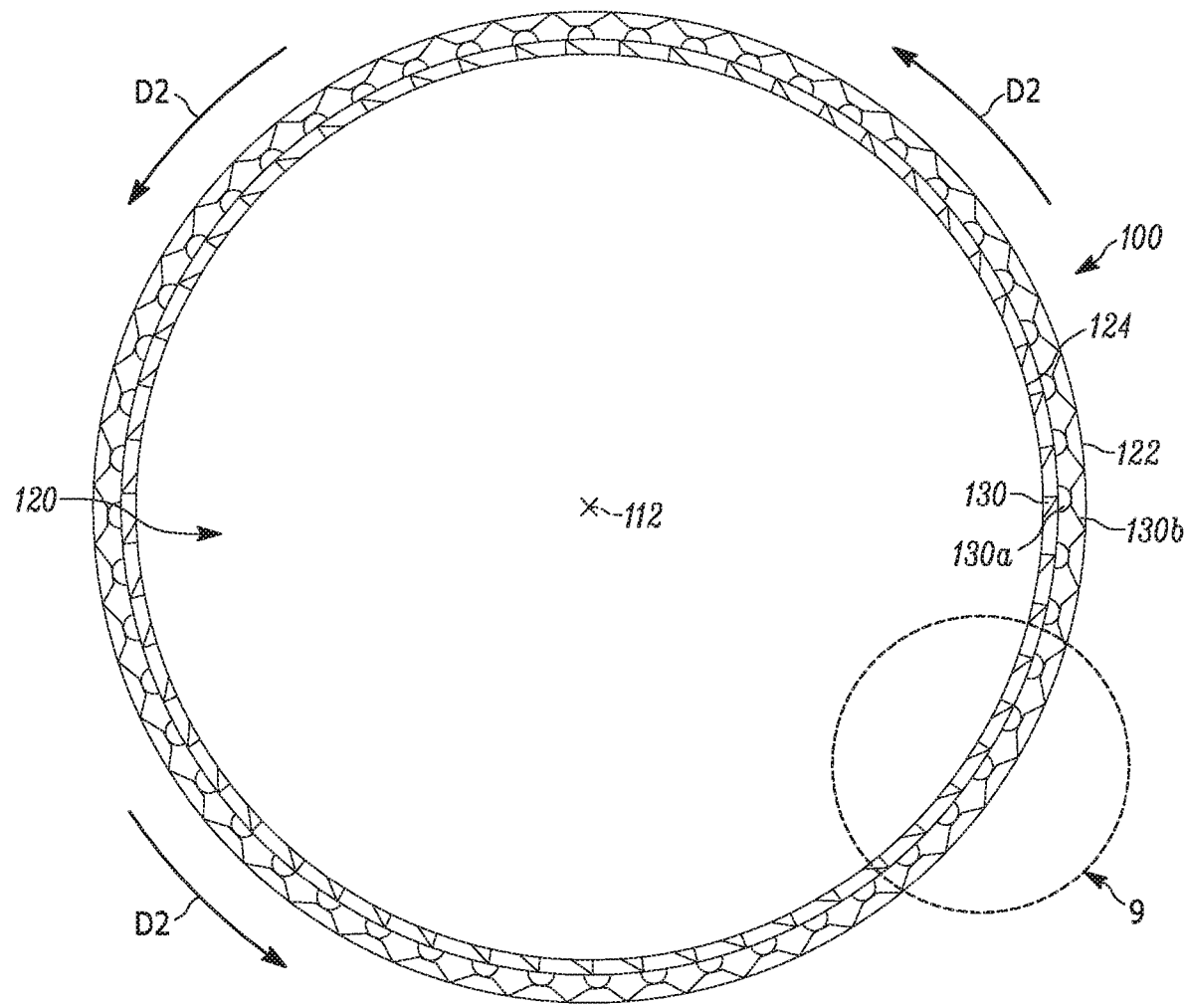
FIGS. 8-9 are schematic illustrations of the filter in a rolled-up condition.
Figure 9:
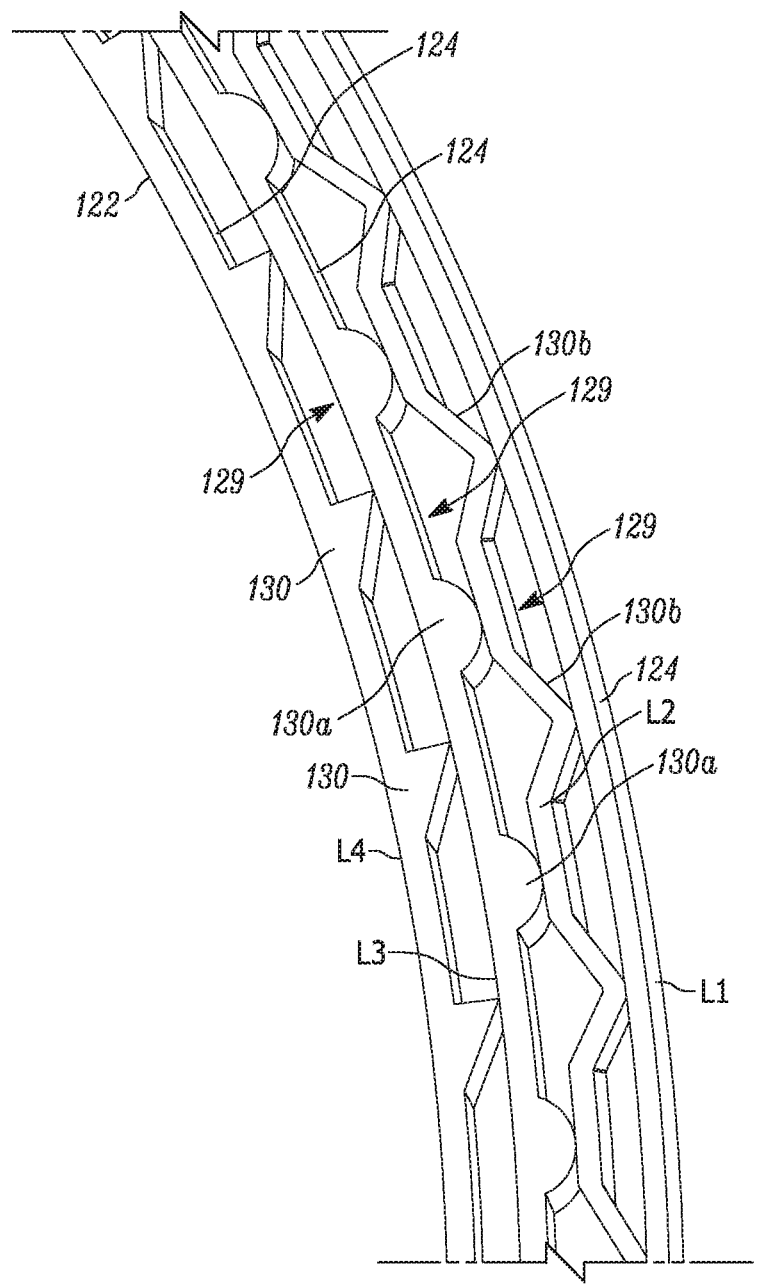

Referring to FIGS. 8-9, when the filter 100 is rolled up about the centerline 112 the deflectors 130 provided the added advantage of spacing the layers from one another in the radial direction. As shown, the filter 100 includes an additional fourth layer L4 inward of the third layer L3 and the first layer L1 is free of deflectors 130. The layers L1-L4 are illustrated with each different deflector 130, 130a, 130b configuration for illustrative purposes only.

Since the deflectors 130 extend from the outer surface 124 of the sheet 122, each layer abuts the deflectors on the adjacent radially Inward layer to define a plenum or gap 129 between the two layers. Consequently, a plenum 129 is formed between the first and second layers L1, L2, between the second and third layers L2, L3, and between the third and fourth layers L3, L4. This configuration increases the surface area of filter 100 through which the inflation fluid must pass before reaching the openings 126 in the diffusor section 20.

Figure 10:
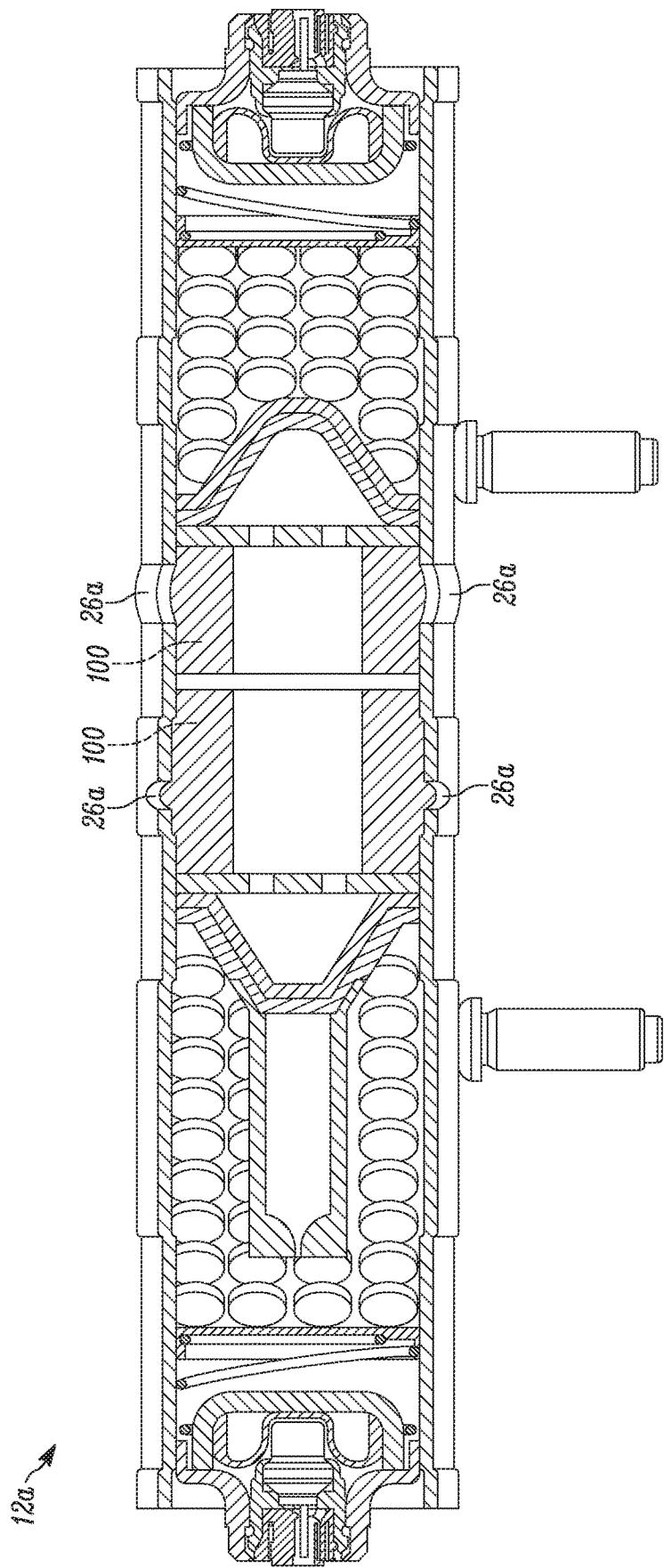
FIGS. 10-12 are schematic illustrations of additional example inflators in which the filter of the present invention can be used.
Figure 11:
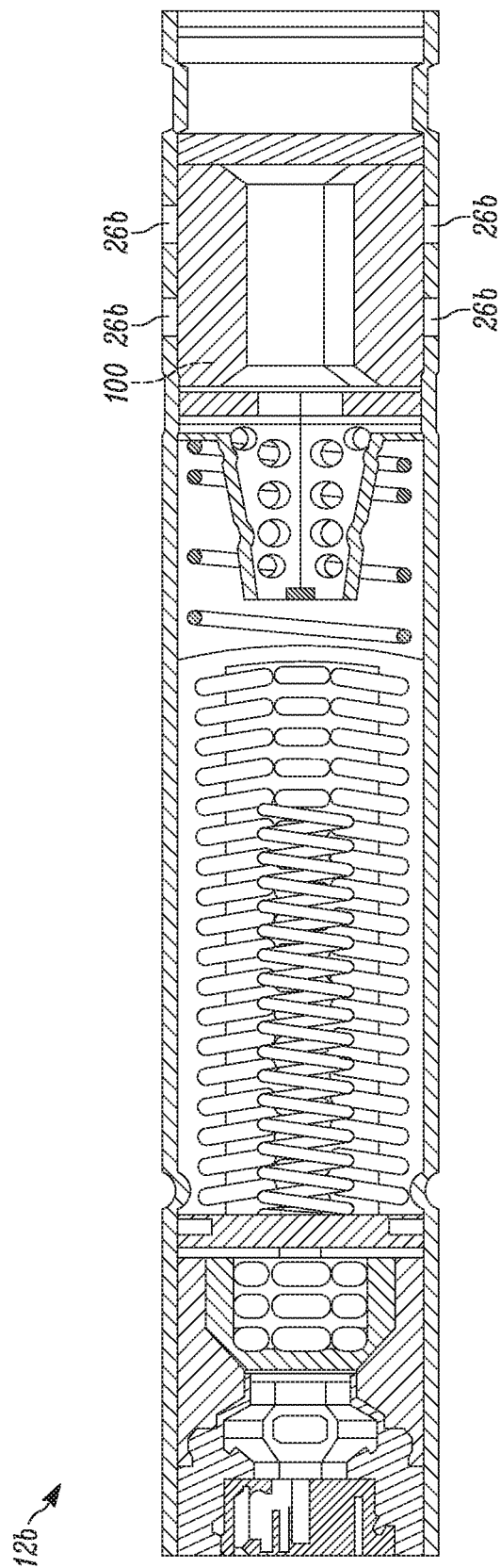
Figure 12:
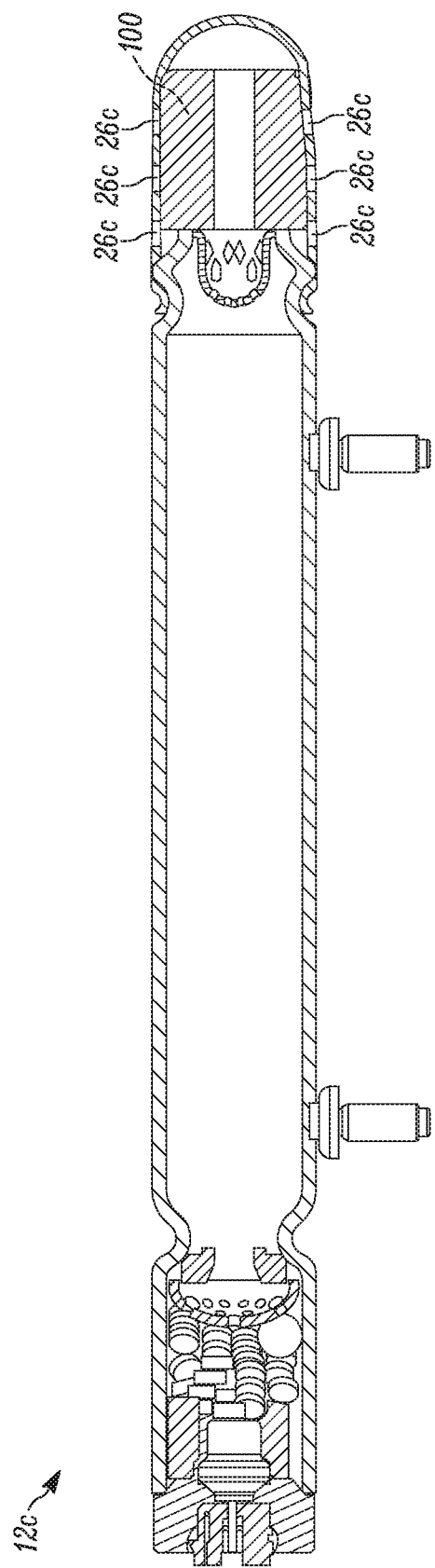

FIGS. 10-12 illustrate various airbag inflators 12a, 12b, 12c for use with the filter of the present invention. As shown, the inflators 12a, 12b are pyrotechnic inflators and the inflator 12c is a hybrid pyrotechnic/stored gas inflator for inflating protection devices located outside the steering wheel. The location of the filter 100 in each inflator 12a-12c is shown in phantom in FIGS. 10-12.

In the example configurations of FIGS. 10-12, the inflators 12a, 12b, 12c are elongated, cylindrical in shape, and include a plurality of circumferentially arranged outlet openings 26a, 26b, 26c. Each inflator 12a, 12b, 12c includes a filter 100. The filter 100 can have any of the configurations described herein, especially any of those described with reference to FIGS. 1-9. To this end, the combustion chamber in which the filter of the present invention resides can be tubular, cylindrical, round, polygonal, toroidal, etc. and, thus, the filter can be contoured to the shape of the combustion chamber.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A filter for an inflator comprising:
a sheet rolled-up about an axis to form multiple rolled layers, the sheet including a plurality of openings arranged in rows and columns, a deflector being associated with each opening for directing inflation fluid in a non-radial direction relative to the axis, wherein:
(i) each deflector defines an exit opening in fluid communication with the associated opening in the sheet; and
(ii) each deflector comprises at least one sidewall.

2. The filter recited in claim 1, wherein the sheet is formed from expanded metal.

3. The filter recited in claim 1, wherein each of the rolled layers has a radially outboard surface and a radially inboard surface, and wherein all of the deflectors project from the outboard surfaces, or all of the deflectors project from the inboard surfaces.

4. The filter recited in claim 1, wherein the deflectors are arranged in a first pattern on a first one of the rolled layers and a second, different pattern on a second one of the rolled layers.

5. The filter recited in claim 4, wherein the deflectors in the first pattern have a first shape and the deflectors in the second pattern have a second shape different from the first shape.

6. The filter recited in claim 1, wherein the deflectors direct inflation fluid circumferentially about the axis.

7. The filter recited in claim 1, wherein the deflectors direct inflation fluid axially in a direction substantially parallel to the axis.

8. The filter recited in claim 1, wherein deflectors on one of the rolled layers of the filter abut an adjacent rolled layer of the filter.

9. The filter recited in claim 1, wherein deflectors on one of the rolled layers abut an adjacent rolled layer of the rolled sheet and define a gap between said layers of the rolled sheet.

10. The filter recited in claim 1, wherein each exit opening has one of a curved, arched, domed, triangular, rectangular, or other polygonal shape.

11. An apparatus for helping to protect an occupant of a vehicle, comprising:

an inflatable vehicle occupant protection device; and an inflator that is actuatable to provide inflation fluid for inflating the inflatable vehicle occupant protection device, wherein the inflator comprises the filter recited in claim 1.

12. The apparatus recited in claim 11, wherein the inflatable vehicle occupant protection device comprises at least one of a driver side air bag, a passenger side air bag, an inflatable side curtain, an inflatable headliner, an inflatable seat belt, an inflatable knee bolster, and a knee bolster operated by an air bag.

13. The apparatus recited in claim 11, wherein the inflator comprises one of a hybrid inflator, a two-stage pyrotechnic inflator, and a single-stage pyrotechnic inflator.

14. The apparatus recited in claim 1, wherein all of the deflectors of the multiple rolled layers direct inflation fluid in the same circumferential direction about the axis.

* * * * *